United States Patent
Shi

(10) Patent No.: US 10,109,910 B2
(45) Date of Patent: Oct. 23, 2018

(54) ANTENNA DEVICE WITH ACCURATE BEAM ELEVATION CONTROL USEABLE ON AN AUTOMATED VEHICLE

(71) Applicant: Delphi Technologies, Inc., Troy, MI (US)

(72) Inventor: Shawn Shi, Thousand Oaks, CA (US)

(73) Assignee: Delphi Technologies, Inc., Troy, MI (US)

( * ) Notice: Subject to any disclaimer, the term of this patent is extended or adjusted under 35 U.S.C. 154(b) by 288 days.

(21) Appl. No.: 15/165,858

(22) Filed: May 26, 2016

(65) Prior Publication Data

US 2017/0346170 A1    Nov. 30, 2017

(51) Int. Cl.
| | |
|---|---|
| *H01Q 1/32* | (2006.01) |
| *H01Q 21/08* | (2006.01) |
| *H01Q 21/06* | (2006.01) |
| *H01Q 21/00* | (2006.01) |
| *G01S 13/93* | (2006.01) |
| *G01S 13/00* | (2006.01) |

(52) U.S. Cl.
CPC ......... *H01Q 1/3233* (2013.01); *G01S 13/931* (2013.01); *H01Q 1/3283* (2013.01); *H01Q 21/0043* (2013.01); *H01Q 21/065* (2013.01); *H01Q 21/08* (2013.01); *G01S 2013/9375* (2013.01)

(58) Field of Classification Search
CPC ............... H01Q 1/3233; H01Q 1/3283; H01Q 21/0043; H01Q 21/08; G01S 13/931; G01S 2013/9375
See application file for complete search history.

(56) References Cited

U.S. PATENT DOCUMENTS

| | | | | |
|---|---|---|---|---|
| 5,495,255 A | * | 2/1996 | Komatsu | H01Q 1/3233 342/128 |
| 7,920,094 B2 | * | 4/2011 | Hansen | H01Q 21/065 343/700 MS |
| 8,493,183 B2 | * | 7/2013 | Yamagajp et al. | H01Q 1/2225 340/10.1 |
| 2002/0080071 A1 | * | 6/2002 | Louzir | H01Q 21/0006 343/700 MS |
| 2007/0063920 A1 | * | 3/2007 | Shionoiri | H01Q 1/2225 343/895 |
| 2007/0241962 A1 | * | 10/2007 | Shinoda | G01S 13/931 342/361 |
| 2009/0046029 A1 | * | 2/2009 | Nagai | H01Q 21/06 343/850 |

(Continued)

*Primary Examiner* — Bernarr E Gregory
(74) *Attorney, Agent, or Firm* — Lawrence D. Hazelto

(57) ABSTRACT

An antenna device includes a plurality of conductive pads that are conductively coupled to each other. A first one of the pads is connected with a first conductive strip. The first conductive strip is not connected to an adjacent second pad. A second conductive strip and a third conductive strip connect the first pad to the second pad. A slot is aligned with the first conductive strip to direct energy from a transceiver at the first conductive strip. The first pad and others in series with it radiate energy based on the energy received by the first conductive strip. The second and third conductive strips conduct energy from the first pad to the second pad. The second pad and others in series with it radiate energy based on the energy received by the second pad. One example use of the antenna device is on an automated vehicle.

14 Claims, 3 Drawing Sheets

(56) References Cited

U.S. PATENT DOCUMENTS

2012/0256795 A1* 10/2012 Tajima ............... H01Q 21/0006
                                              343/700 MS
2014/0375525 A1   12/2014 Shi
2015/0263429 A1    9/2015 Vahidpour et al.

* cited by examiner

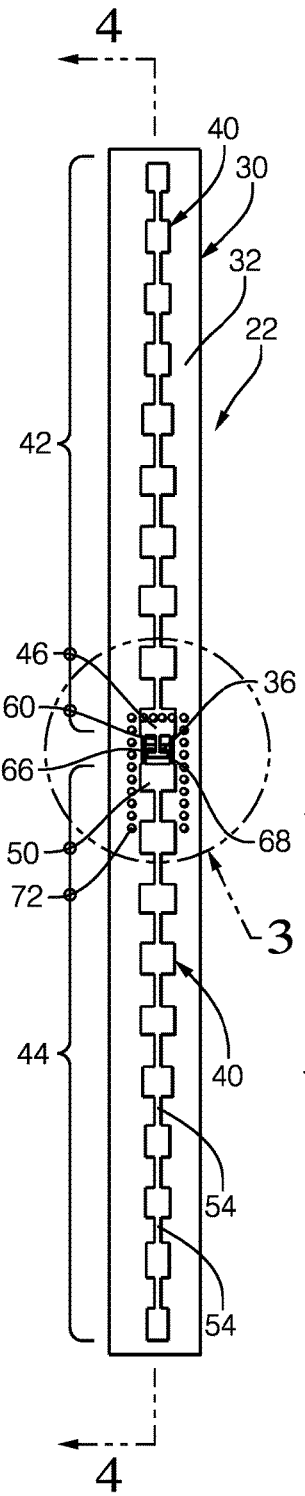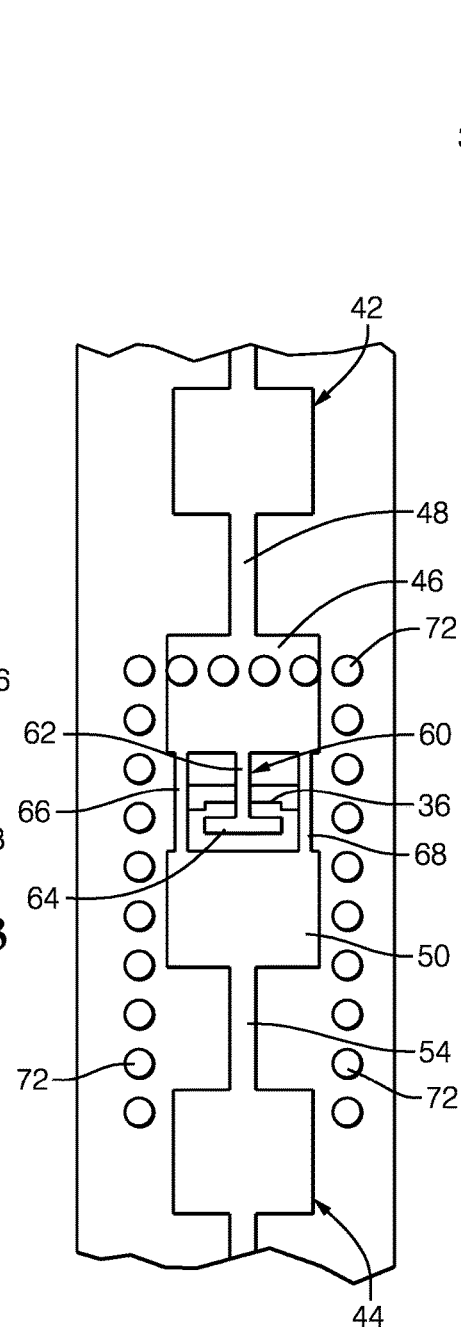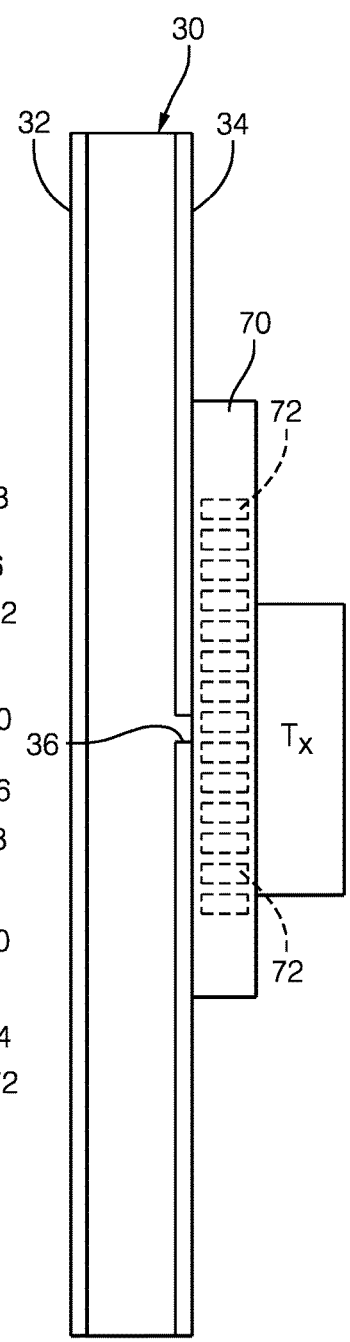
FIG. 2
FIG. 3
FIG. 4

ANTENNA DEVICE WITH ACCURATE BEAM ELEVATION CONTROL USEABLE ON AN AUTOMATED VEHICLE

BACKGROUND

Radar and other detection systems have a variety of uses. More recently, automotive vehicles have included increasing amounts of detection technology that utilizes radar signaling or principles for detecting objects in the vicinity or pathway of a vehicle.

Long range antennas for vehicle-based radar systems often have a narrow elevation beam-width to achieve high gain for increased sensitivity. One challenge associated with such arrangements is assuring that the beam is pointing at the proper elevation angle. If the beam is not properly oriented, undesired reflections from the ground or an overhead bridge may be detected. Such reflections do not indicate useful information and preferably are avoided.

In some instances, the inaccuracy of the beam elevation results from the way in which the antenna portion has been built or manufactured. Moreover, the size of an antenna device desired for use on an automotive vehicle is so small that minor manufacturing discrepancies can result in pronounced beam elevation error. Improvements in antenna design and manufacturing techniques are needed to avoid inaccuracies in detector performance and scrap parts resulting from inaccuracies during manufacturing.

SUMMARY

An illustrative example antenna device includes a substrate having a first surface and a second surface. A plurality of conductive pads are on the first surface. A first conductive strip extends from a first one of the conductive pads toward an adjacent, second one of the conductive pads. The first conductive strip is spaced from the second one of the conductive pads. Second and third conductive strips extend between the first one of the conductive pads and the second one of the conductive pads. The second and third conductive strips establish a conductive connection between the first one of the conductive pads and the second one of the conductive pads. The second and third conductive strips are respectively on opposite sides of the first conductive strip. A slot in the second surface of the substrate is aligned with at least a portion of the first conductive strip.

In an example embodiment having one or more features of the antenna device of the previous paragraph, the plurality of conductive pads includes a first array of conductive pads aligned with the first one of the conductive pads on a side of the first one of the conductive pads that is opposite the second one of the conductive pads. The first array of conductive pads are conductively coupled in series.

In an example embodiment having one or more features of the antenna device of either of the previous paragraphs, the plurality of conductive pads includes a second array of conductive pads aligned with the second one of the conductive pads on a side of the second one of the conductive pads that is opposite the first one of the conductive pads. The second array of conductive pads are conductively coupled in series.

In an example embodiment having one or more features of the antenna device of any of the previous paragraphs, energy transmitted through the slot is conducted by the first conductive strip, the first array of conductive pads are configured to radiate based on energy received by the first one of the conductive pads from the first conductive strip, and the second array of conductive pads are configured to radiate based on energy received by the second one of the conductive pads from at least one of the second and third conductive strips.

In an example embodiment having one or more features of the antenna device of any of the previous paragraphs, the plurality of conductive pads are arranged in a line and a spacing between adjacent ones of the conductive pads is equal to a wavelength of radiation from the antenna device at a selected frequency.

In an example embodiment having one or more features of the antenna device of any of the previous paragraphs, the slot has a slot width and a slot length, the slot length is oriented transverse to a direction from the first one of the conductive pads toward the second one of the conductive pads, and the slot length is less than a spacing between the second and third conductive strips.

In an example embodiment having one or more features of the antenna device of any of the previous paragraphs, the slot is U-shaped.

In an example embodiment having one or more features of the antenna device of any of the previous paragraphs, energy transmitted through the slot is directly incident upon the first conductive strip, the first conductive strip conducts energy to the first one of the conductive pads, and the second and third conductive strips conduct energy from the first one of the conductive pads to the second one of the conductive pads.

In an example embodiment having one or more features of the antenna device of any of the previous paragraphs, the first conductive strip has a first portion oriented in a direction from the first one of the conductive pads toward the second one of the conductive pads and the first conductive strip has a second portion oriented transverse to the first portion.

An example embodiment having one or more features of the antenna device of any of the previous paragraphs includes a substrate integrated waveguide situated near the second surface of the substrate. The substrate integrated waveguide is situated to direct energy toward the slot.

An illustrative example method of making an antenna device includes establishing a plurality of conductive pads on a first surface of a substrate; establishing a first conductive strip extending from a first one of the conductive pads toward an adjacent, second one of the conductive pads, the first conductive strip being spaced from the second one of the conductive pads; establishing second and third conductive strips extending between the first one of the conductive pads and the second one of the conductive pads, the second and third conductive strips establishing a conductive connection between the first one of the conductive pads and the second one of the conductive pads, the second and third conductive strips respectively being on opposite sides of the first conductive strip; and forming a slot in a second surface of the substrate, the slot being aligned with at least a portion of the first conductive strip.

In an example embodiment having one or more features of the method of the previous paragraph, establishing the plurality of conductive pads includes establishing a first array of conductive pads aligned with the first one of the conductive pads on a side of the first one of the conductive pads that is opposite the second one of the conductive pads; conductively coupling the first array of conductive pads in series; establishing a second array of conductive pads aligned with a second one of the conductive pads on a side of the second one of the conductive pads that is opposite the first one of the conductive pads; and conductively coupling the second array of conductive pads in series.

In an example embodiment having one or more features of the method of either of the previous paragraphs, establishing the plurality of conductive pads includes arranging the plurality of conductive pads in a line and spacing adjacent ones of the conductive pads from each other a distance equal to a wavelength of radiation from the antenna device at a selected frequency.

In an example embodiment having one or more features of the method of any of the previous paragraphs, forming the slot includes establishing a slot width and a slot length, orienting the slot length transverse to a direction from the first one of the conductive pads toward the second one of the conductive pads, and establishing the slot length to be less than a spacing between the second and third conductive strips.

In an example embodiment having one or more features of the method of any of the previous paragraphs, establishing the first conductive strip includes orienting a first portion of the first conductive strip in a direction from the first one of the conductive pads toward the second one of the conductive pads and orienting a second portion of the first conductive strip transverse to the first portion.

An example embodiment having one or more features of the method of any of the previous paragraphs includes situating a substrate integrated waveguide near the second surface of the substrate where the substrate integrated waveguide is configured to direct energy toward the slot.

An illustrative example embodiment of a detector for use on a vehicle for detecting an object in a vicinity or pathway of the vehicle includes an antenna device configured to emit radiation in a selected beam pattern at a selected angle relative to an associated vehicle. The antenna device includes a substrate having a first surface and a second surface; a plurality of conductive pads on the first surface, the plurality of conductive pads including a first array of conductive pads conductively coupled in series and a second array of conductive pads conductively coupled in series; a first conductive strip extending from a first one of the conductive pads of the first array toward an adjacent, second one of the conductive pads of the second array, the first conductive strip is spaced from the second one of the conductive pads; second and third conductive strips extending between the first one of the conductive pads and the second one of the conductive pads, the second and third conductive strips establishing a conductive connection between the first one of the conductive pads and the second one of the conductive pads, the second and third conductive strips respectively being on opposite sides of the first conductive strip; and a slot in the second surface of the substrate, the slot being aligned with at least a portion of the first conductive strip.

In an example embodiment having one or more features of the detector of the previous paragraph, energy transmitted through the slot is conducted by the first conductive strip; the first array of conductive pads are configured to radiate based on energy received by the first one of the conductive paths from the first conductive strip; the second array of conductive paths are configured to radiate based on energy received by the second one of the conductive pads from at least one of the second and third conductive strips; and the at least one of the second and third conductive strips receives energy from the first one of the conductive pads.

In an example embodiment having one or more features of the detector of either of the previous paragraphs, energy transmitted through the slot is directly incident upon the first conductive strip; the first conductive strip conducts energy to the first one of the conductive pads; and the second and third conductive strips conduct energy from the first one of the conductive pads to the second one of the conductive pads.

An example embodiment having one or more features of the detector of any of the previous paragraphs includes a substrate integrated waveguide situated near the second surface of the substrate. The substrate integrated waveguide is situated to direct energy toward the slot.

Various features and advantages of at least one disclosed example embodiment will become apparent to those skilled in the art from the following detailed description. The drawings that accompany the detailed description can be briefly described as follows.

BRIEF DESCRIPTION OF THE DRAWINGS

FIG. 2 schematically illustrates selected features of an antenna device designed according to an embodiment of this invention.

FIG. 3 schematically illustrates the portion of FIG. 2 encircled at 3.

FIG. 4 is a cross-sectional illustration taken along the lines 4-4 of FIG. 2.

DETAILED DESCRIPTION

Embodiments of this invention provide control over the orientation of a beam radiated by an antenna device. One example use for antenna devices having features of the disclosed example embodiment is to provide a narrow elevation, wide azimuth beam pattern. Such beams are useful, for example, in radar or other detector systems, which may be useful for automotive vehicles including automated vehicles.

Figure 1:
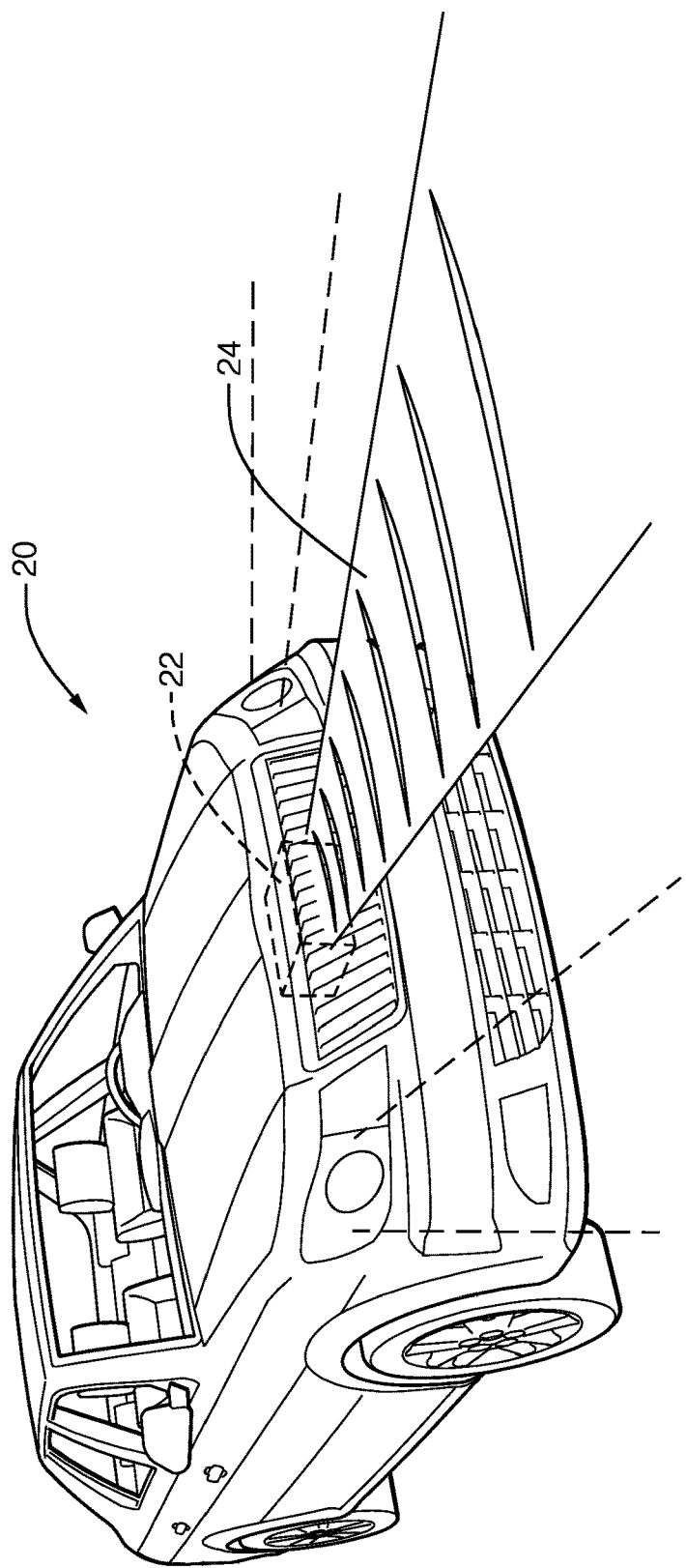
FIG. 1 schematically illustrates a vehicle having an antenna device designed according to an embodiment of this invention.

FIG. 1 schematically illustrates an example vehicle 20 that has a detector 22 supported on the vehicle. The detector 22 includes an antenna device that radiates a beam 24 in a selected direction and at a selected orientation relative to the vehicle 20. The example radiated beam 24 is a narrow elevation, wide azimuth beam, which has a relatively compact height in the vertical direction and a relatively wide spread in the horizontal direction. Such beams are useful for detecting objects in a pathway of the vehicle 20 for various purposes.

FIGS. 2-4 schematically show selected features of an example antenna device that is part of the detector 22. In this example, the antenna device includes a substrate 30 having a first surface 32 and a second surface 34. The first surface 32 corresponds to a conductive plane while the second surface 34 corresponds to a ground plane in some example embodiments. The material of the substrate 30 may be selected to achieve desired loss, bandwidth, and cost characteristics. One example embodiment includes the commercially available material known as Rodgers 4350B. Other embodiments include materials, such as polytetrafluoroethylene, which may be more expensive but tends to introduce less loss. Given this description, those skilled in the art will be able to select an appropriate material to meet their particular needs.

A slot 36 is formed in the second surface 34 of the substrate 30. The total area or length of the slot 36 controls the efficiency of energy transmission. The slot 36 may have a variety of configurations to achieve the desired efficiency and still fit within the available space. As best appreciated from FIG. 3, the slot 36 has a U-shaped configuration.

The antenna device includes a plurality of conductive pads 40 arranged in a line on the first surface 32 of the substrate 30. The plurality of conductive pads 40 includes a first array of conductive pads at 42 and a second array of conductive pads at 44. All of the plurality of conductive pads 40 may be considered a single array. The first array 42 and second array 44 are utilized for discussion purposes. The plurality of conductive pads 40 may be established on the surface 32 using known etching techniques, for example.

The first array 42 includes a first one of the conductive pads 46. Other conductive pads of the first array 42 are connected in series with the first one of the conductive pads 46. The other conductive pads of the first array 42 are conductively connected by conductive strips 48, which in this embodiment comprise micro-strips.

The second array 44 includes a second one of the conductive pads 50. Others of the conductive pads within the second array 44 are conductively coupled in series with the second one of the conductive pads 50. Conductive strips 54, such as micro-strips, conductively couple the conductive pads of the second array 44 to each other in series.

The spacing between the conductive pads 40 in an example embodiment corresponds to one wavelength for a selected frequency of radiation from the antenna device.

As best appreciated from FIG. 3, the slot 36 is aligned with the spacing between the first one of the conductive pads 46 and the second one of the conductive pads 50. A first conductive strip 60 extends from the first one of the conductive pads 46 toward the second one of the conductive pads 50 without making electrically conductive contact with the second one of the conductive pads 50. The total length of the first conductive strip 60 determines the efficiency of energy transmission. In order to fit the desired length of the conductive strip 60 in the limited space between the first one of the conductive pads 46 and the second one of the conductive pads 50, the first conductive strip is more than a single, straight line. In this example, the first conductive strip 60 has a first portion 62 that is oriented parallel to a direction from the first one of the conductive pads 46 toward the second one of the conductive pads 50. A second portion 64 of the first conductive strip 60 is oriented transverse to the first portion 62. The first conductive strip 60 is T-shaped in this example.

A second conductive strip 66 conductively couples the first one of the conductive pads 46 to the second one of the conductive pads 50. A third conductive strip 68 also couples the first one of the conductive pads 46 to the second one of the conductive pads 50. The second conductive strip 66 and third conductive strip 68, respectively, are on opposite sides of the first conductive strip 60.

The first array 42 including the first one of the conductive pads 46 and the second array 44 including the second one of the conductive pads 50 are symmetrically arranged with respect to the location of the slot 36 and the conductive strips 60, 66 and 68. As illustrated, equal numbers of conductive pads 40 are on opposite sides of that location. The pads in the first array 42 also have the same configuration as those in the second array 44. In such embodiments, the first array 42 is a mirror image of the second array 44 when considered exclusive of the conductive strips 60, 66 and 68. Such symmetry and the relationship between the slot 36 and the first conductive strip 60 ensures a desired beam angle even if the position of the slot 36 relative to the first one of the conductive pads 46 varies slightly while still having the slot 36 aligned with at least a portion of the first conductive strip 60.

In some example embodiments, the conductive pads 40 and all conductive strips connecting them including the first conductive strip 60, second conductive strip 66 and third conductive strip 68 are all etched as one piece on the first surface 32.

The slot 36 has a slot length and a slot width. In the illustrated example of FIG. 3, the slot length is transverse to each of the first portion 62 of the first conductive strip 60, the second conductive strip 66, and the third conductive strip 68. The slot length is less than a distance or spacing between the second conductive strip 66 and the third conductive strip 68. In other words, the position of the slot 36 does not overlap with the position of either of the second conductive strip 66 or the third conductive strip 68. Instead, the slot is aligned with at least a portion of the first conductive strip 60.

The dimensions and configuration of the slot 36 may be varied to meet different needs. The U-shape of the slot 36 in the illustrated example provides impedance matching for some embodiments. Achieving a desired surface area of the slot 36 without overlapping the position of the second conductive strip 66 and third conductive strip 68 can be achieved using a U-shaped configuration of the slot 36, for example.

As shown in FIG. 4, a substrate integrated waveguide (SIW) 70 is situated adjacent the second surface 34 of the substrate 30. The SIW 70 includes a plurality of conductive members 72 arranged in a known configuration. The SIW 70 directs energy from a transceiver 74 toward the slot 36 so that energy from the transceiver 74 is incident upon the first conductive strip 60. Such energy received by the first conductive strip 60 is conducted to the first one of the conductive pads 46 and through the conductive strips 48 to each of the conductive pads in the first array 42. Energy from the first one of the conductive pads 46 is conducted along at least one of the second conductive strip 66 and the third conductive strip 68 to the second one of the conductive pads 50. Energy received by the second one of the conductive pads 50 is conducted through the strips 54 to the other conductive pads in the second array 44. Each of the conductive pads is configured to radiate energy based on the energy initially received from the transceiver 74 by the first conductive strip 60, which results from the energy emanating through the slot 36.

Since the slot directs energy only at the first conductive strip 60, the first array 42 is fed by the first conductive strip 60, and the second array 44 is fed by at least one of the second and third conductive strips 66 and 68, any variation in the position of the slot 36 relative to the plurality of conductive pads 40 does not have an appreciable, negative impact on the performance of the antenna device provided that the slot 36 is appropriately aligned with at least a portion of the first conductive strip 60 without overlapping either of the second or third conductive strips 66 or 68. The configuration of the conductive pads on opposite sides of the first conductive strip 60 allows for some tolerance in the position of the slot 36 relative to the position of the plurality of conductive pads 40.

Figure 5A:
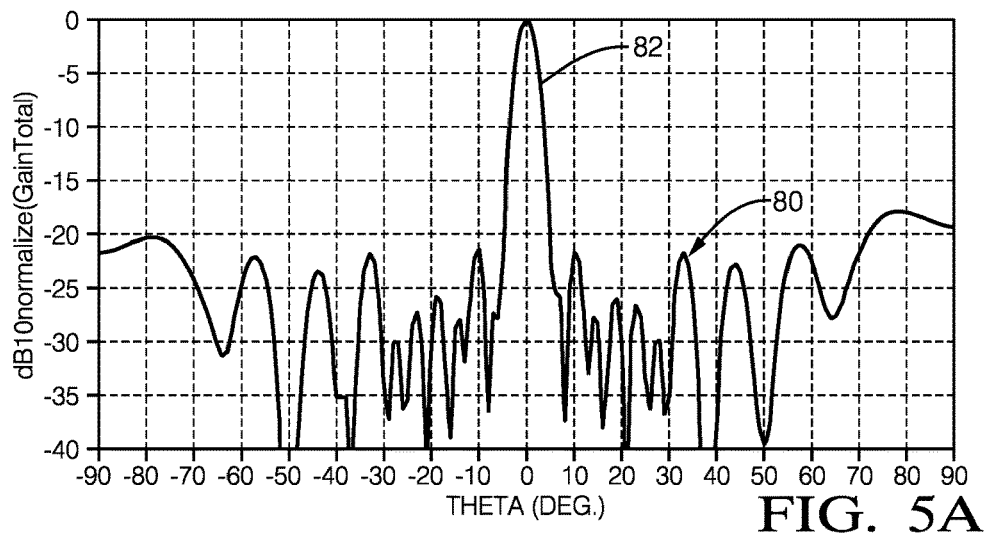
FIG. 5A schematically illustrates a beam pattern radiated from an antenna device designed according to an embodiment of this invention.
Figure 5B:
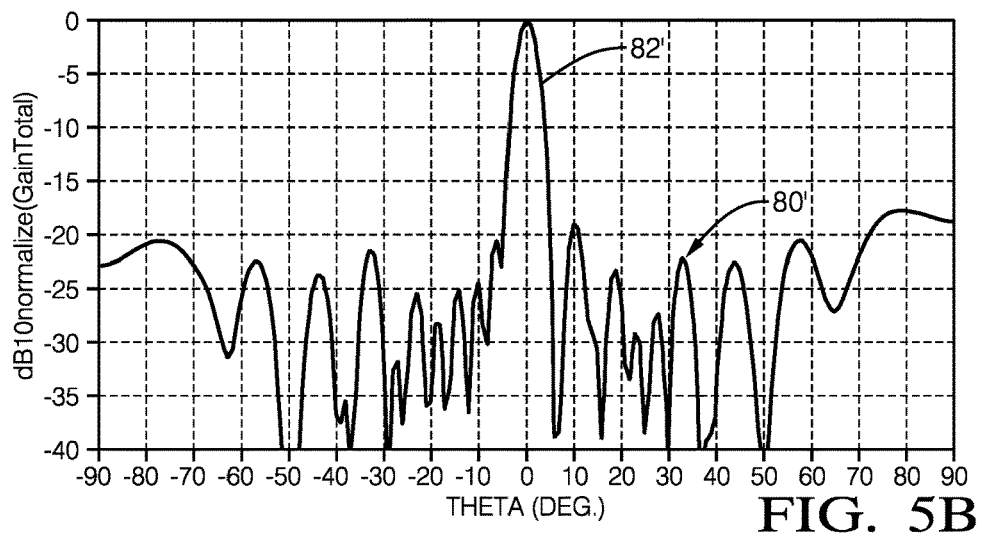
FIG. 5B schematically illustrates a beam pattern from an antenna device designed according to an embodiment of this invention.

FIG. 5A includes a plot 80 that schematically illustrates a desired beam pattern with a beam at a desired bore sight schematically shown at 82 resulting from a position of the slot 36 centered between the pads 46 and 50. FIG. 5B illustrates a beam pattern 80 with the same arrangement of the plurality of conductive pads 40 but the position of the slot 36 moved by a distance of up to 4 mils compared to FIG. 5A. Although the beam pattern 80' of FIG. 5B varies slightly from the beam pattern 80 of FIG. 5A, the beam remains very close to the desired bore sight as shown at 82'. The operation of the first conductive strip 60 and the second and third conductive strips 66 and 68 facilitates having the same phase in the first array 42 and the second array 44 even with slight changes in the slot position relative to the pads 46 and 50.

Figure 5C:
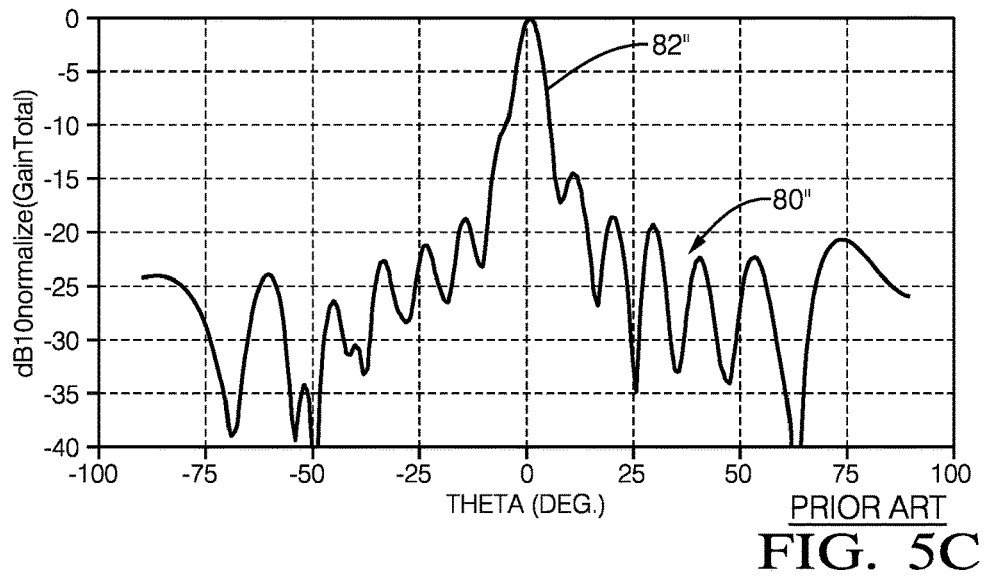
FIG. 5C schematically illustrates a beam pattern from an antenna device designed according to the prior art.

FIG. 5C schematically illustrates beam behavior in an embodiment of an antenna device that does not include the first conductive strip 60, second conductive strip 66 and third conductive strip 68 aligned with a slot such as that shown in FIG. 3. The antenna device corresponding to FIG. 5C only has a single conductive strip between every one of the conductive pads of the antenna device. If the slot in the substrate surface is not perfectly aligned with the center of a central pad of such an antenna device, the phase will be different in different portions of the device. This results in a radiation pattern schematically shown at 80" which has a different phase on opposite sides of the beam at bore sight 82". The beam pattern shown in FIG. 5C results in an angle of beam direction that is either too low or too high compared to a desired beam orientation relative to a vehicle.

The illustrated example embodiment of FIGS. 2-4 provides additional manufacturing tolerance for the position of the slot 36 relative to the plurality of conductive pads 40 with a resulting beam angle orientation that is within acceptable limits. The configuration and manufacturing technique of the embodiment of FIGS. 2-4 reduces the amount of scrap because more consistent antenna device behavior is achievable even with slight variations in the relative position of the slot 36 relative to the plurality of conductive pads 40, provided that the slot 36 is aligned with the first conductive strip 60.

The preceding description is exemplary rather than limiting in nature. Variations and modifications to disclosed examples may become apparent to those skilled in the art that do not necessarily depart from the essence of this invention. The scope of legal protection given to this invention can only be determined by studying the following claims.

I claim:

1. An antenna device, comprising:
a substrate having a first surface and a second surface;
a plurality of conductive pads on the first surface;
a first conductive strip extending from a first one of the conductive pads toward an adjacent, second one of the conductive pads, the first conductive strip being spaced from the second one of the conductive pads;
second and third conductive strips extending between the first one of the conductive pads and the second one of the conductive pads, the second and third conductive strips establishing a conductive connection between the first one of the conductive pads and the second one of the conductive pads, the second and third conductive strips respectively being on opposite sides of the first conductive strip; and
a slot in the second surface of the substrate, the slot being aligned with at least a portion of the first conductive strip.

2. The antenna device of claim 1, wherein
the plurality of conductive pads includes a first array of conductive pads aligned with the first one of the conductive pads on a side of the first one of the conductive pads that is opposite the second one of the conductive pads; and
the first array of conductive pads are conductively coupled in series.

3. The antenna device of claim 2, wherein
the plurality of conductive pads includes a second array of conductive pads aligned with the second one of the conductive pads on a side of the second one of the conductive pads that is opposite the first one of the conductive pads; and
the second array of conductive pads are conductively coupled in series.

4. The antenna device of claim 3, wherein
energy transmitted through the slot is conducted by the first conductive strip;
the first array of conductive pads are configured to radiate based on energy received by the first one of the conductive pads from the first conductive strip; and
the second array of conductive pads are configured to radiate based on energy received by the second one of the conductive pads from at least one of the second and third conductive strips.

5. The antenna device of claim 1, wherein
the plurality of conductive pads are arranged in a line; and
a spacing between adjacent ones of the conductive pads is equal to a wavelength of radiation from the antenna device at a selected frequency.

6. The antenna device of claim 1, wherein
the slot has a slot width and a slot length;
the slot length is oriented transverse to a direction from the first one of the conductive pads toward the second one of the conductive pads; and
the slot length is less than a spacing between the second and third conductive strips.

7. The antenna device of claim 1, wherein the slot is U-shaped.

8. The antenna device of claim 1, wherein
energy transmitted through the slot is directly incident upon the first conductive strip;
the first conductive strip conducts energy to the first one of the conductive pads; and
the second and third conductive strips conduct energy from the first one of the conductive pads to the second one of the conductive pads.

9. The antenna device of claim 1, wherein
the first conductive strip has a first portion oriented in a direction from the first one of the conductive pads toward the second one of the conductive pads; and
the first conductive strip has a second portion oriented transverse to the first portion.

10. The antenna device of claim 1, comprising
a substrate integrated waveguide situated near the second surface of the substrate, the substrate integrated waveguide being situated to direct energy toward the slot.

11. A detector for use on a vehicle for detecting an object in a vicinity or pathway of the vehicle, the detector comprising an antenna device configured to emit radiation in a selected beam pattern at a selected angle relative to an associated vehicle, the antenna device including:
a substrate having a first surface and a second surface;
a plurality of conductive pads on the first surface, the plurality of conductive pads including a first array of conductive pads conductively coupled in series and a second array of conductive pads conductively coupled in series;

a first conductive strip extending from a first one of the conductive pads of the first array toward an adjacent, second one of the conductive pads of the second array, the first conductive strip being spaced from the second one of the conductive pads;

second and third conductive strips extending between the first one of the conductive pads and the second one of the conductive pads, the second and third conductive strips establishing a conductive connection between the first one of the conductive pads and the second one of the conductive pads, the second and third conductive strips respectively being on opposite sides of the first conductive strip; and a slot in the second surface of the substrate, the slot being aligned with at least a portion of the first conductive strip.

12. The detector of claim 11, wherein energy transmitted through the slot is conducted by the first conductive strip;

the first array of conductive pads are configured to radiate based on energy received by the first one of the conductive pads from the first conductive strip;

the second array of conductive pads are configured to radiate based on energy received by the second one of the conductive pads from at least one of the second and third conductive strips; and the at least one of the second and third conductive strips receives energy from the first one of the conductive pads.

13. The detector of claim 11, wherein energy transmitted through the slot is directly incident upon the first conductive strip;

the first conductive strip conducts energy to the first one of the conductive pads; and the second and third conductive strips conduct energy from the first one of the conductive pads to the second one of the conductive pads.

14. The detector of claim 11, comprising a substrate integrated waveguide situated near the second surface of the substrate, the substrate integrated waveguide being situated to direct energy toward the slot.

* * * * *